Apr. 24, 1923.
J. O. HEINZE
1,453,134
TRACTOR
Filed June 18, 1921
3 Sheets-Sheet 1
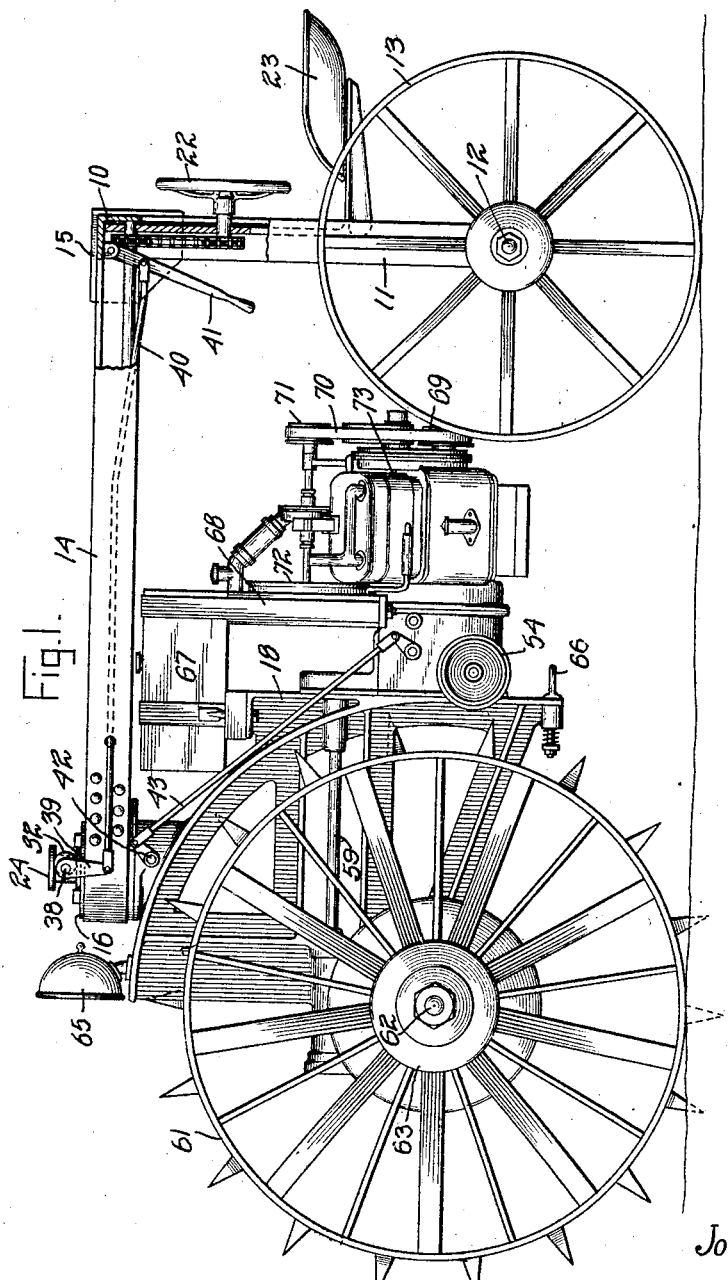
Inventor
John O. Heinze
By
Attorney

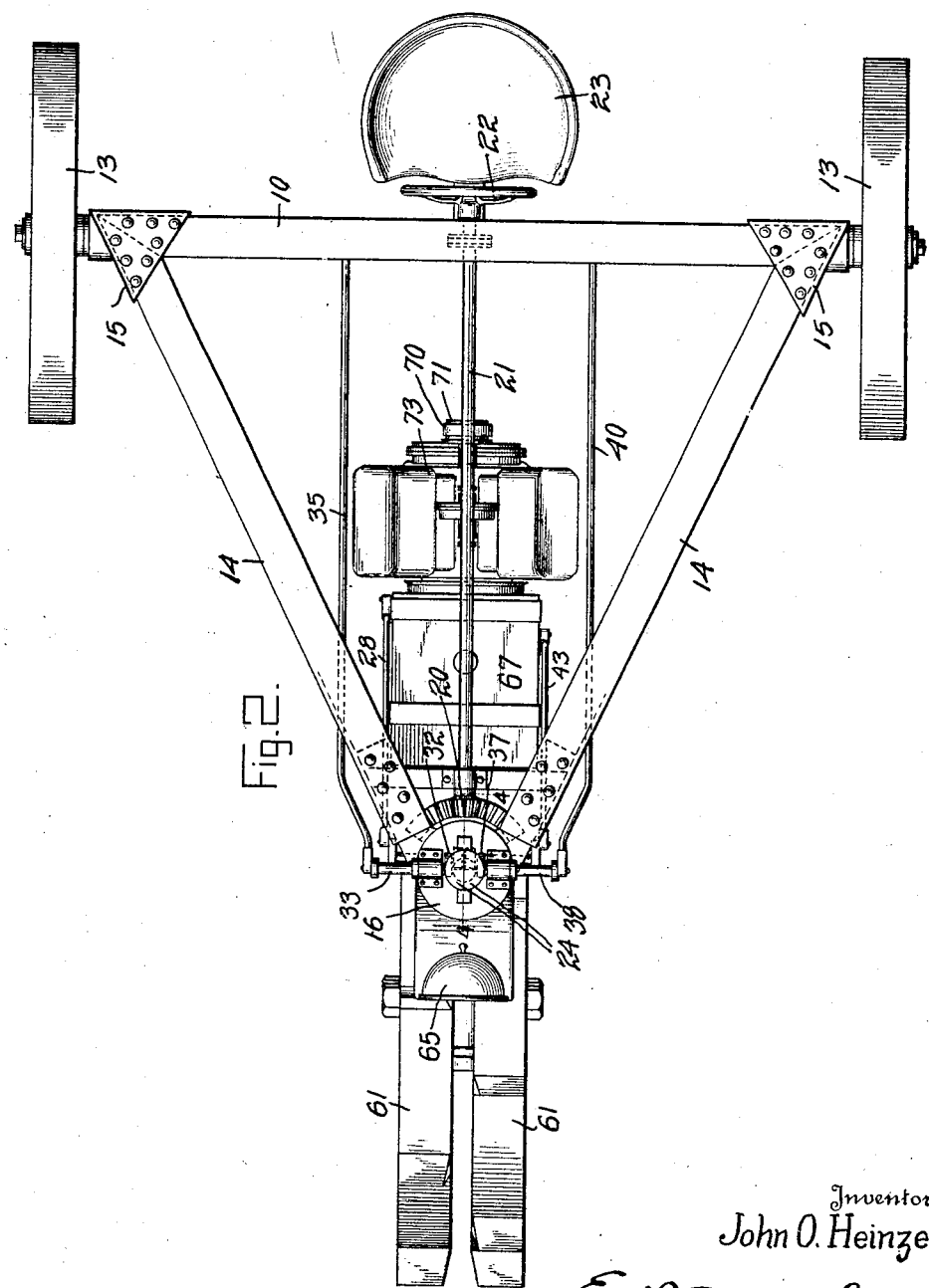

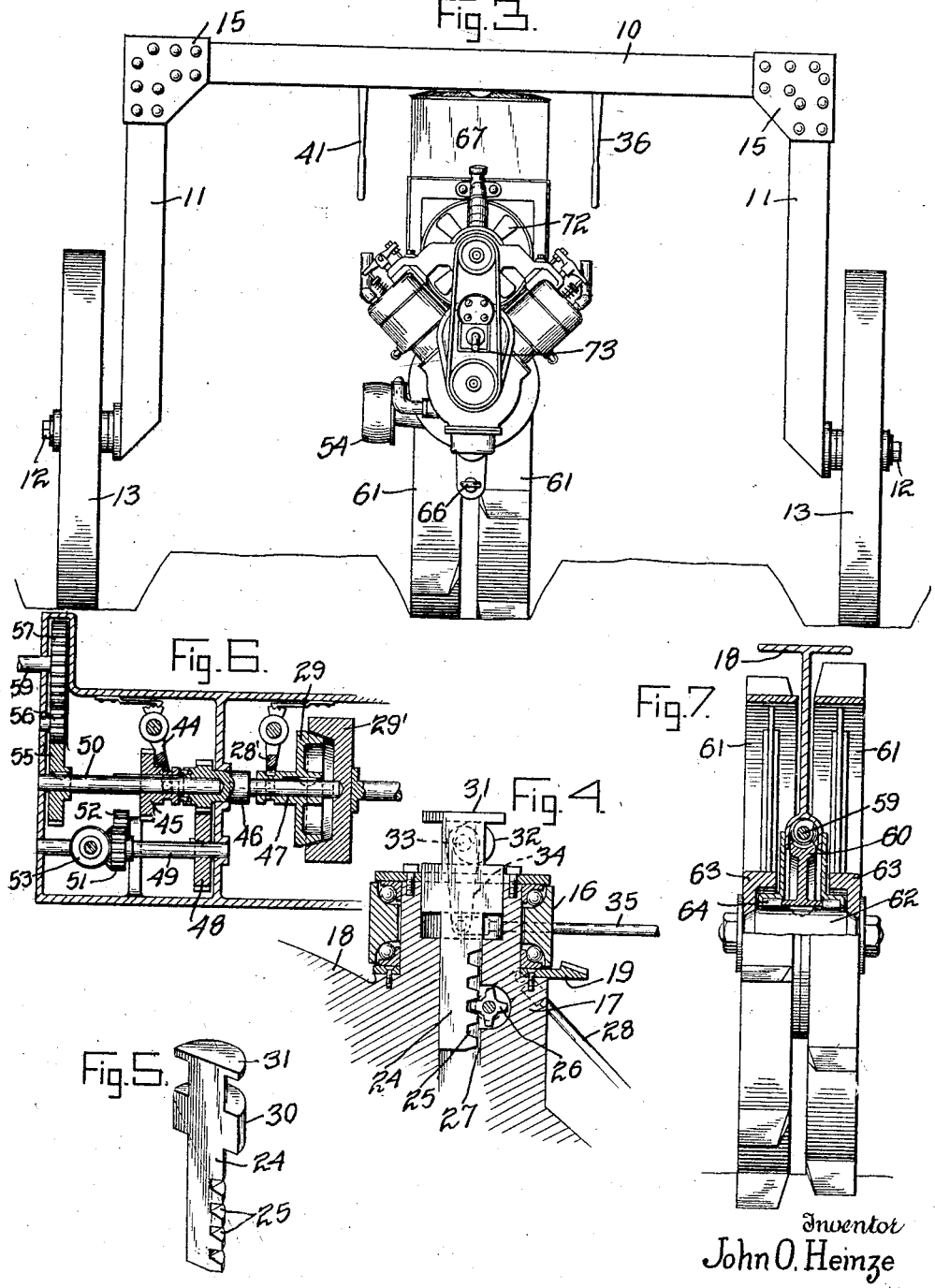

Patented Apr. 24, 1923.

1,453,134

UNITED STATES PATENT OFFICE.

JOHN O. HEINZE, OF LAKELAND, FLORIDA.

TRACTOR.

Application filed June 18, 1921. Serial No. 478,612.

*To all whom it may concern:*

Be it known that I, JOHN O. HEINZE, a citizen of the United States, residing at Lakeland, in the county of Polk and State of Florida, have invented certain new and useful Improvements in Tractors, of which the following is a specification.

My said invention relates to a three wheeled motor vehicle and the improvements embodied therein are intended for use mainly in connection with tractors for agricultural purposes. It is an object of my invention to provide a tractor which shall be particularly useful in cultivating growing crops or in manipulating any agricultural machinery where it is desirable that certain portions of the ground shall remain undisturbed.

A further object of my invention is to provide a tractor in which the engine and connected parts shall be carried in a frame mounted on the single traction wheel which is also steered by the driver to steer the machine. This insures that the weight of the machine shall fall between the rows in a field and forms a well balanced easy turning structure. A further object of my invention is to place all the frame elements which might contact with growing crops in an elevated position safely out of the way, the connections to the controlling mechanisms of the device being also placed in elevated position so as to be accessible to the operator without moving from his seat.

My invention also includes improved means for steering the machine and controlling the driving gearing.

Referring to the accompanying drawings which are made a part hereof and on which similar reference characters indicate similar parts, Figure 1 is a side view of my improved device, Figure 2, a plan thereof, Figure 3, a rear elevation, Figure 4, a section on line 4—4 of Figure 2, Figure 5, a detail of a pin shown in Figure 4, Figure 6, is a section through the driving gearing, and Figure 7, a detail of the front wheel with parts broken away to show the axle and its bearings.

Referring to the drawings reference character 10 indicates the rear member of a triangular frame constituting the rear axle of the machine, this member having downwardly extending parts or supports 11 which carry the axles 12 on which are journaled the rear wheels 13 of the tractor, these wheels being of ordinary type. Extending diagonally from the axle are two frame members 14 connected to the axle by caps 15 which extend over and down the outer side of parts 10 and 14. Parts 14 may if desired, be formed in a single piece or as shown in the drawings may be attached to an annular collar 16 which encircles the post 17 on the frame 18, this frame being supported by the front wheel and the post 17, and carrying the engine, the transmission gearing therefor and other conventional parts. Preferably ball bearings are interposed between collar 15 and post 17, as shown in Figure 4.

Intermediate the ends of the post is a ring 19 having a rearwardly projecting portion constituting a segment rack with teeth engaging the teeth of a beveled pinion 20 on a rearwardly extending shaft 21 provided with a steering wheel 22 adjacent the driver's seat 23.

A pair of pins 24 extend downward into the post 17 and have at one side near their lower ends series of teeth 25 forming racks for engagement with pinions 26. The right-hand pinion is mounted on a shaft 27 having a rock arm connected by a link 28 to a rock arm fast to a shifter 28' for the movable clutch member 29 which engages clutch member 29' on the engine crankshaft to drive the machine. The pins 24 near their upper ends have semicircular enlargements 30 movable in an opening at the top of the post 17 and above these enlargements are opposed enlargements 31. An eccentric 32 on a shaft 33 is positioned between two enlargements on that one of the pins through which the main clutch is operated and rotation thereof moves the pin up or down to actuate the train of parts connected to the clutch for moving it in or out.

The shaft 33 has a rock arm 34 attached thereto and this is connected by a link 35 to a hand lever 36 at the right-hand side of the driver, the link passing through an opening in a member 14 of the frame. A similar train of mechanism comprising an eccentric 37, a shaft 38, a rock arm 39, a link 40 and a hand lever 41 serves through the other of the two pins to actuate a second pinion and thereby a shaft 42 having a rock arm connected by a link 43 to a rock arm on a second clutch shifter 44 for reversing the drive to back the machine. A clutch shifter 44 actuates a combined gear and clutch member 45. The clutch member has pins for engagement with holes in a combined gear and clutch member 46 projecting from a shaft 47 to which the clutch member 29 is splined. The teeth on member 46 engage with a gear 48 on shaft 49 parallel to shaft 47 and to a shaft 50 on which member 45 is splined. Shaft 49 carries a pinion 51 having teeth engaging pinion 52 and also having beveled teeth engaging a pinion 53 which drives a pulley 54 (Figure 1) at the side of the frame, this pulley being constantly driven and serving as a means for transmitting power from the tractor through a belt to any desired machine, the tractor serving at such times as a stationary engine. On the shaft 50 is a gear 55 which drives a train of gears 56 and 57 the last gear being mounted on a shaft 58 carrying at its forward end, a worm 59 (Figure 7) driving a worm gear 60 on the front wheel.

The auxiliary frame 18 supports the front end of the main frame and is supported preferably by a single wheel or the equivalent of a single wheel in order that the machine may be steered easily and also to enable the wheel to run in a furrow or between the rows in a field of corn or the like. The drawings show a preferred form of such a device consisting of a pair of traction wheels 61, 61, which are rigidly attached to an axle 62 by a bolt extending through the axle and having the necessary nuts and washers for forcing the hubs 63 into engagement with the conical ends of axle 62. This provides a balanced structure, the shaft 58 passing between the wheels and the weight of the auxiliary frame with the engine and other attached parts being divided equally between the wheels.

A worm gear 60 is splined to the axle and the axle rotates in a bearing in frame 18, preferably having roller bearings 64 to diminish the friction.

It will be seen that one of the front wheels may be omitted without rendering the machine inoperative, and that the two closely-spaced wheels fixed to the axle act substantially as one wheel. The term "a single traction wheel" is therefore used in certain of the claims to indicate either a single wheel in the strict sense, or a traction device that functions in substantially the manner of a single wheel. This may consist of two or even more wheels, which may have wide or narrow rims or be otherwise varied in form, but which should be ordinarily narrow enough over all so that they can run in a furrow or between the rows in a field, and which are spaced to admit a driving shaft between them.

The frame 18 also carries a head light 65, and a yielding device 66 to which any desired mechanism such as cultivators, seeders and so forth may be attached. At its rear end the frame carries a fuel tank 67 and a radiator 68. A pulley 69 on the engine shaft is connected by a belt 70 to a pulley 71 driving a shaft which carries a fan 72. The engine, preferably of V-shape, and its constituent and connected parts are, or may be, all of conventional type.

In operation the engine is started by means of a crank 73 and the lever 36 is operated to throw in the clutch 29 and drive the machine forward. At this time the clutch shifter 44 is in the position shown at 46. If it is desired to drive the pulley 54 with the machine standing still shifter 44 is operated to move the combined gear and clutch member 45 to the second position indicated in dotted lines so that it is out of engagement with the member 46. In this position the shaft 50 is stationary and therefore the front traction wheel is not driven. To drive the machine in the reverse direction shifter 44 is moved from the first dotted line position to the second dotted line position at the left where the gear teeth on member 45 engage the teeth of gear 52. The drive for the traction wheel now goes through shaft 47, the gear on member 46, gear 48, shaft 49, gears 51, 52, 45, shaft 50, gears 55, 56, 57 and so on to the traction wheel. The operation of the remaining parts in so far as it is not conventional has been fully explained heretofore.

As indicated in Figure 3 when the tractor is used for operating on crops planted in rows as in cultivating corn or cotton and performing other similar operations on analogous crops, the front wheel will run between two rows and the rear wheels run outside the same two rows. At the same time the frame is elevated entirely out of reach of the ordinary crops and the outer wheels and upright parts of the axle are far enough out so that they are not likely to strike against and break off corn stalks or the like. Because of the arrangement of the engine and its supporting frame on the front wheel it is unusually easy to steer the tractor in such a way as to avoid collisions with other objects and damage ensuing therefrom. The steering and controlling mechanisms are also within reach of the operator who is seated at the extreme rear of the machine where he can observe the operations of such devices as may be attached to traction member 66.

It will be evident that various modifications may be made in my device as shown and described without departing from the invention as set forth in the appended claims and therefore I do not limit myself to the specific device shown in the drawings and described in the specification.

Having thus fully described my said invention, what I claim as new and desire to secure by Letters Patent, is:

1. In a tractor, a traction wheel, a pair of spaced supporting wheels, a main frame having a U-shaped axle for the supporting wheels, a pair of horizontal converging members secured to the shoulders of said axle, a bearing supported by the converging members at their forward ends, an auxiliary frame supported on said traction wheel for carrying the engine and related parts, a vertical post on said auxiliary frame extending into said bearing on the main frame, an operator's seat suspended midway of the U-shaped axle, and a steering wheel and engine controlling devices carried by said axle adjacent to said seat, whereby a clearance for growing crops is provided beneath said main frame and at each side of said traction wheel from end to end of the tractor, substantially as set forth.

2. In a tractor, a front traction wheel, a pair of spaced rear supporting wheels, a frame extending rearwardly from the front wheel and carried thereby, said frame having a vertical pivot in the main frame, and controlling means for the engine comprising vertically movable pins in the pivot, connections extending therefrom to the rear of the machine for actuation by the driver, and connections extending from the pins to the transmission gear for controlling the direction of movement of the machine, substantially as set forth.

3. A tractor comprising a main frame, a pair of supporting wheels therefor, a single traction wheel, an auxiliary frame carried by the traction wheel and supporting the driving means for the machine, a post on said auxiliary frame extending into a bearing on the main frame, and means for steering the machine comprising a segment rack adjacent to and concentric with said post, a shaft, a steering wheel on the shaft, and a pinion on the shaft meshing with said rack, substantially as set forth.

4. In a tractor, a main frame, a pair of supporting wheels therefor, a single traction wheel at the front of the machine, an auxiliary frame swingable with said traction wheel, a post thereon engaging a bearing in the main frame, and means for controlling the operations of the machine comprising pins movable up and down on said post, connections from the pins to hand levers at the rear of the machine and connections also extending from said pins to the transmission gearing, substantially as set forth.

5. A tractor comprising a main frame, supporting wheels therefor, an auxiliary frame, a single traction wheel on the auxiliary frame having closely approached duplicate wheel members, an engine in rear of the traction wheel and swingable therewith, and means connecting the engine to the traction wheel comprising an axle on which the duplicate wheel members are rigidly fixed thereon, a worm wheel fixed to the axle, an engine shaft, a shaft parallel to and driven by the engine shaft, said latter shaft being located between said parallel wheel members, and a worm on said shaft for engaging said worm wheel, substantially as set forth.

6. In a tractor, a triangular frame, supporting wheels at two corners thereof, an auxiliary wheeled frame having a post extending into a bearing at the third corner, an engine carried by the auxiliary frame having driving gearing for the tractor, and means on the main frame connected to the gearing through said post to control said driving gearing, substantially as set forth.

7. In a tractor, a motor, a main frame triangularly formed and having an apex forwardly disposed to form an annular collar, an auxiliary frame segmentally formed the center of the segment providing a bearing for a steering wheel and means adjacent the upper part of the segment to form a bearing with the said annular collar, the lower part of the segment being adapted to support the motor, substantially as set forth.

8. In a tractor, a triangular skeleton frame elevated to clear growing crops, trailing wheels at the rear corners thereof, a traction wheel at the front end of the frame, an auxiliary frame pivoted to the main frame and carried by the traction wheel, an engine and transmission gearing on the auxiliary frame behind the traction wheel and occupying a space substantially equal in width to said wheel, and engine controlling connections extending upward through the pivot and thence to the rear of the frame on a level with the upper part of said skeleton frame, substantially as set forth.

9. In a tractor, a triangular frame comprising a U-shaped rear axle forming the base of a triangle, an annular bearing at the apex of the triangle, a front traction wheel comprising two wheel members closely spaced and fixed together, a narrow segmental auxiliary frame extending between them and forming a bearing for the axle, said segmental frame carrying a lamp at its upper end, a vertical post adjacent the lamp engaging said bearing, an eye at the lower end for attachment of farm implements, an engine at its rear side and shafting to transmit the power of the engine to the traction wheel, the post having a segment rack concentric therewith, steering mechanisms at the rear of the triangular frame and a pinion meshing with said rack and operated by said steering mechanisms, substantially as set forth.

10. A three-wheeled tractor comprising a pair of closely-approached wheel members rigidly secured together to form a steering wheel, a pair of trailing wheels behind the steering wheel, a thin segmental frame extending between said wheel members and swingable with the steering wheel, a circular casing about the axis of the steering wheel, a worm wheel in the casing adapted to drive the steering wheel, a worm engaging said worm wheel, a shaft journaled in the segmental frame and carrying said worm, and an engine carried by the frame behind said steering wheel and adapted to drive said shaft, substantially as set forth.

11. A tractor comprising a pair of closely-approached wheel members rigidly secured together to form a steering wheel, a pair of trailing wheels behind the steering wheel, a thin segmental frame extending between said wheel members and swingable with the steering wheel, an engine carried by said frame behind the steering wheel and means for driving the wheel from the engine including a shaft journaled on the segmental frame and geared to the steering wheel between said wheel members, substantially as set forth.

12. A tractor comprising a pair of closely-approached wheel members rigidly secured together to form a steering wheel, a pair of trailing wheels behind the steering wheel, a thin segmental frame extending between said wheel members and swingable with the steering wheel, an engine on said frame behind the steering wheel, and transmission gearing on the frame between the engine and the wheel including a shaft journaled on the segmental frame and geared to the steering wheel between said wheel members, substantially as set forth.

13. A tractor comprising a pair of closely-approached wheel members rigidly secured together to form a steering wheel, a pair of trailing wheels behind the steering wheel, a thin segmental frame extending between said wheel members and swingable with the steering wheel, means on the segment at the rear of the wheel for driving the tractor, and a connecting means at the lower corner of the segment for attachment of agricultural implements, whereby the said means is substantially on a line between the steering wheel axle and the load, substantially as set forth.

14. A tractor comprising a pair of closely-approached wheel members rigidly secured together to form a steering wheel, a pair of trailing wheels behind the steering wheel, a thin segmental frame extending between said wheel members and swingable with the steering wheel, means on the segment at the rear of the wheel for driving the tractor, a headlight fixed on the frame at the upper end of the segment and dirigible therewith, substantially as set forth.

15. In a tractor, a single traction wheel having a pair of closely-approached wheel members, a pair of trailing wheels, a frame carried by the three wheels and having its horizontally-extended parts elevated to clear growing crops, an auxiliary frame carried by said traction wheel and pivotally connected to the main frame, an engine carried by the auxiliary frame behind the traction wheel and said engine geared to said wheel, substantially as set forth.

16. In a tractor, a main frame elevated to clear growing crops, a single traction wheel, a pair of trailing wheels spaced so as to provide clearance for growing crops on both sides of the traction wheel, an auxiliary frame carried by the traction wheel and pivoted to the main frame, an engine on the auxiliary frame and in the rear of the traction wheel, and a pulley driven by the engine and projecting to one side of the auxiliary frame into the space between the traction wheel and one of the trailing wheels, said pulley being substantially on a level with the axles of the supporting wheels for the tractor, substantially as set forth.

17. In a tractor, a triangular skeleton frame elevated to clear growing crops, trailing wheels at the rear corners thereof, a traction wheel at the front end of the frame, an auxiliary frame pivoted to the main frame and carried by the traction wheel, an engine and transmission gearing below the main frame and on the auxiliary frame behind the traction wheel and occupying a space substantially equal in width to said wheel, substantially as set forth.

18. In a tractor, a motor, a main frame triangularly formed, a pair of rear wheels and a forward driving wheel, supports connected to two of the apexes of the main frame to elevate the main frame above the rear driving wheels to clear growing crops, an auxiliary segmental frame pivotally mounted near one end of the arc to the other apex of the main frame and carrying said motor at the other end of said arc, the center of the segment forming a bearing for the said forward driving wheel, substantially as set forth.

19. In a tractor, a motor, a driving wheel, a pair of trailing wheels, a main frame triangularly formed and elevated to clear growing crops, an auxiliary segmental frame whose center forms a bearing for the driving wheel, means for pivotally supporting the main frame at one apex thereof to the upper end of the arc of the auxiliary frame and means for mounting the motor at the other end of the arc, substantially as set forth.

In witness whereof, I have hereunto set my hand and seal at Washington, District of Columbia this 17th day of June, A. D. nineteen hundred and twenty-one.

JOHN OTTO HEINZE. [L. S.]

Witnesses:
W. W. HARRIS,
FRANK W. DAHN.